Dec. 4, 1934.  D. EVANS  1,982,799
CONVEYER SCREW FOR LOCOMOTIVE STOKERS
Filed May 29, 1933
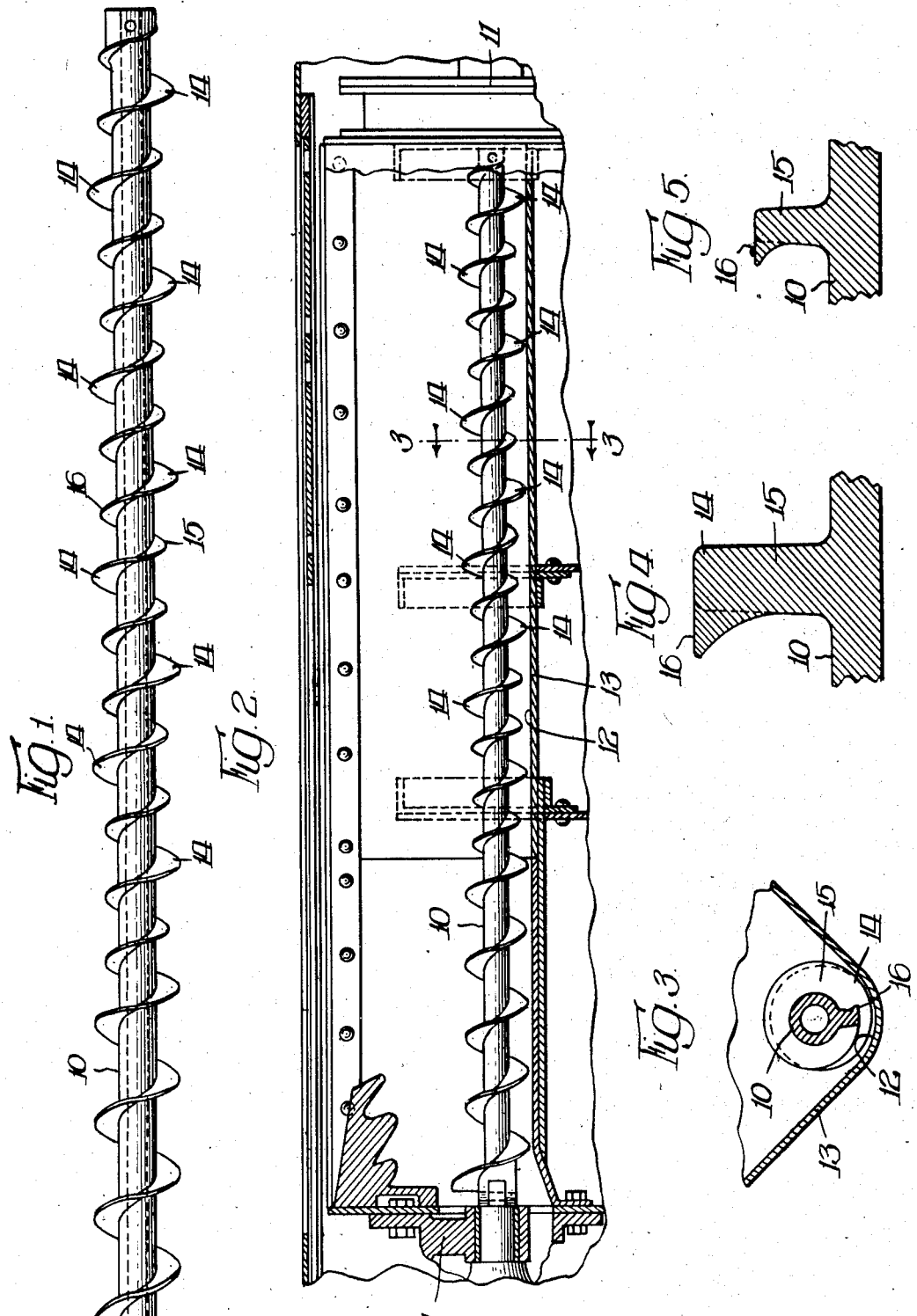
Inventor:
David Evans, Patented Dec. 4, 1934

1,982,799

UNITED STATES PATENT OFFICE 1,982,799

CONVEYER SCREW FOR LOCOMOTIVE STOKERS

David Evans, Chicago, Ill., assignor to Chicago Steel Foundry Co., Chicago, Ill., a corporation of Maine Application May 29, 1933, Serial No. 673,462

4 Claims. (Cl. 198—213)

The object of this invention is to provide an improved conveyer screw for use in locomotive stokers or in other feeding devices where the material being fed contains oversize lumps which need to be reduced.

The improved screw is characterized by a novel feeding flight which is eccentrically curved at its outer edge with respect to the axis of the screw and is preferably cupped forwardly at its outer edge.

While the foregoing statements are indicative in a general way of the nature of the invention, other more specific objects and advantages will be apparent to those skilled in the art upon a full understanding of the construction, arrangement and operation of the improved screw.

One form of the invention is presented herein by way of exemplification, but it will of course be appreciated that the invention is susceptible of embodiment in other structurally modified forms coming equally within the scope of the appended claims.

In the accompanying drawing:

Fig. 1 is a side view of the improved screw;

Fig. 2 is a longitudinal section through a conveyer trough, showing the screw in position;

Fig. 3 is a section through the trough and screw, taken on the line 3—3 of Fig. 2;

Fig. 4 is a section through the flight of the screw, taken at one of the high or maximum radius points; and Fig. 5 is a corresponding section, taken at one of the low or minimum radius points.

The screw which forms the subject matter of this invention may be used in many different types of conveyer troughs, for feeding many different kinds of materials, but for the purpose of illustration it is shown in the drawing as installed in the conveyer trough of a locomotive stoker of ordinary type, where it is used for handling coal.

The screw 10 is journaled at its ends in suitable bearing brackets 11, and is positioned with its axis concentric with the curved bottom 12 of the V-shaped trough 13, with the hereinafter described large radius points 14 on the helically extending flight 15 of the screw spaced slightly from the curved bottom of the trough.

For a part of the length of the screw the radius of the flight 15 alternately increases and decreases, at regular intervals, with gradual variation, and the high points 14, which are the points of maximum radius, are spaced apart about every one and one-half turns, although other spacing arrangements may be employed. This gradual variation provides an eccentric outer edge 16 on the flight which performs both a feeding and a crushing operation on the material. The outer edge 16 is preferably concave and provided with a thickened rim which projects axially in the direction of feed. This cuplike formation produces a very satisfactory feeding action, provides a relatively wide crushing surface, and also permits of a considerable amount of wear on the edge before the screw becomes unserviceable and requires replacement. By spacing apart the maximum radius points over one and one-half turns, the high points will occur on one side of the screw every three turns and will occur on the opposite side every three turns, with the high points on opposite sides in staggered relation, as clearly shown in Fig. 1 of the drawing.

I claim:

1. A screw of the character described for operation in a substantially uniform conduit, characterized by a helically extending flight the radius of which gradually increases and decreases alternately at regular intervals to provide an eccentrically curved feeding edge which will alternately approach and recede from the opposed surface of the conduit throughout the length of such edge upon rotation of the screw.

2. A screw of the character described, characterized by a helically extending flight which varies gradually in radius between a minimum and a maximum about every one and one-half turns whereby to provide an eccentrically curved feeding edge.

3. A screw of the character described, characterized by a helically extending flight which varies gradually in radius between a minimum and a maximum about every one and one-half turns whereby to provide an eccentrically curved feeding edge, said flight having the feeding surface thereof concave.

4. A screw of the character described for operation in a substantially uniform conduit, characterized by a solid helically extending flight which is disposed with its front surface substantially at right angles to the axis of the screw and is provided with an eccentrically curved feeding edge which will alternately approach and recede from the opposed surface of the conduit throughout the length of such edge upon rotation of the screw.

DAVID EVANS.